US006466207B1

(12) United States Patent
Gortler et al.

(10) Patent No.: US 6,466,207 B1
(45) Date of Patent: *Oct. 15, 2002

(54) REAL-TIME IMAGE RENDERING WITH LAYERED DEPTH IMAGES

(75) Inventors: Steven J. Gortler, Cambridge, MA (US); Li-wei He, Bellevue; Michael F. Cohen, Seattle, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,941

(22) Filed: Mar. 18, 1998

(51) Int. Cl.$^7$ .............................................. G06T 15/10
(52) U.S. Cl. ........................ 345/427; 345/419; 345/422
(58) Field of Search ................................. 345/419, 422, 345/427

(56) References Cited

U.S. PATENT DOCUMENTS 4,807,158 A * 2/1989 Blanton ...................... 364/521
5,684,935 A * 11/1997 Demesa, III et al. ....... 345/419

OTHER PUBLICATIONS

Max, N. "Heirarchical Rendering of Trees from Precomputed Multi–Layer Z–Buffers." UCRL–JC–123366. URL= http://www.llnL.gov/tid/lof/documents/pdf/231063.pdf, Feb. 1996.*

Mark, et al. "Post–Rendering 3D Warping". Proc. of the 1997 Symposium on Interactive 3D Techniques, Apr. 30, 1997.*

Foley et al. Computer Graphics: Principles and Practice. "Section 18.11.5 Support for Enhanced 3D Perception". pp. 915–919, 1994.*

\* cited by examiner

*Primary Examiner*—Mark Zimmerman
*Assistant Examiner*—Philip Stevenson
(74) *Attorney, Agent, or Firm*—Christensen O'Connor Johnson Kindness PLLC (57) ABSTRACT

A method and computer product for rendering real-time three-dimensional images on a display based on view manipulation of prestored depth images in a global coordinate space. First, a layered depth image is generated from multiple depth images based on a predetermined display viewpoint. If the determined viewpoint is within a predetermined threshold of the layered depth image, the generated layered depth image is warped based on the determined display viewpoint, pixels from the layered depth image are splatted onto the warped image, and an output image is generated and displayed based on the splat pixels. If the determined viewpoint is outside the predetermined threshold of the previously generated layered depth image, a next closest layered depth image is generated. If the next closest layered depth image is not fully generated, the previously generated layered depth image is used to generate an output image. If the next closest layered depth image is fully generated, the process is repeated for the generated next closest layered depth image.

14 Claims, 7 Drawing Sheets

REAL-TIME IMAGE RENDERING WITH LAYERED DEPTH IMAGES

FIELD OF THE INVENTION

This invention relates to imaging rendering and, more particularly, to an improved method, apparatus and computer product for space transformation in an image based rendered scene.

BACKGROUND OF THE INVENTION

Image based rendering (IBR) techniques are efficient ways of rendering real and synthetic objects in a three-dimensional scene. With traditional rendering techniques, the time required to render an image becomes unbounded as the geometric complexity of the scene increases. The rendering time also increases as the shading computations become more complex.

In the simplest IBR technique, one synthesizes a new image from a single input depth image (DI). A DI is an image with z-buffer information stored with each pixel. Hidden surfaces are not included in the input image, and thus the image has an effective depth complexity of one. Shading computations that have been computed for the input image can be reused by subsequent images. Finally, if a depth image is obtained from a real world scene using real images, new views can be created with IBR methods without first creating a traditional geometric representation of the scene.

Because the pixels of an image form a regular grid, IBR computations are largely incremental and inexpensive. Moreover, McMillan, in Leonard McMillan, "A list-priority rendering algorithm for redisplaying projected surfaces", *UNC Technical Report*, 95-005, University of North Carolina, 1995, presents an ordering algorithm that ensures that pixels in the synthesized image are drawn back to front, and thus no depth comparisons are required. This also permits proper alpha compositing or blending of pixels without depth sorting.

Despite these advantages, there still exist many problems with current IBR methods. For example, if the viewer moves slightly and thereby uncovers a surface, no relevant information is available for this newly unoccluded surface. This occurs because a single DI has no information about hidden surfaces. A simple solution to this problem is the use of more than one input DI. If n input images are used, the size of the scene description is multiplied by n, and the rendering cost increases accordingly. Moreover, with more than one input DI, hidden surface removal must be performed.

Another difficulty arises because the input DI has a different sampling pattern and density than the output image. When mapping the discrete pixels forward from the input DI, many pixels might squeeze together in an output pixel. These pixels must be properly blended for anti-aliasing. Also, forward mapping of the image spreads the pixels apart, creating gaps in the output image. One solution includes performing a backwards mapping from the output image location to the input DI. This is an expensive operation that requires some amount of searching in the input DI. Another solution is to think of the input DI as a mesh of micro-polygons, and to scan-convert these polygons in the output image. This is also expensive, because it requires a polygon scan-convert setup for each input pixel.

The simplest solution to fill gaps in the output image is to predict the projected size of an input pixel in the new projected view, and to "splat" the input pixel into the output image using a precomputed footprint. For the splats to combine smoothly in the output image, the outer regions of the splat should have fractional alpha values and be composed into the new image using an ordering algorithm. This requires the output pixels to be drawn in depth order. But, McMillan's ordering algorithm cannot be applied when more than one input DI is used, and so a depth sort is required.

Nelson Ma in "Rendering trees from precomputed z-buffer views, Sixth Eurographics Workshop on Rendering", *Eurographics*, June 1995, discusses using layered depth images (LDI) for the purpose of high quality anti-aliasing. LDIs are images that include information of objects that are hidden by foreground objects. In other words, an LDI includes multiple depth layers. Max warps from n input LDIs with different camera information to an output LDI, thereby rendering at about five minutes per frame. This technique generates high quality anti-aliasing of the output picture, but is expensive and cannot run in real time.

The present invention is directed to overcoming the foregoing and other disadvantages. More specifically, the present invention is directed to providing a method, apparatus, and computer product suitable for real-time MBR of objects in a transversable three-dimensional space.

SUMMARY OF THE INVENTION

In accordance with this invention, a method and computer product for rendering real-time three-dimensional images on a display based on viewpoint manipulation of prestored depth images in a global coordinate space is provided.

The method formed in accordance with this invention includes warping pixels from one or more depth images to a layered depth image. The warping of pixels from one or more depth images to a layered depth image is performed by retrieving depth image pixels that correspond to a ray traced location within the layered depth image, comparing the z-value of the retrieved pixels to the z-values of the pixels previouisly stored at z-value layers within the layered depth image at the ray traced locations within the layered depth image that correspond to the retrieved pixels from the depth images, and saving the retrieved pixels in the layered depth image based on the ray traced location and the retrieved pixel's z-value, if no previously stored pixels have a compared z-value that is less than a preset value from the retrieved pixels' z-values. The retrieved pixels are averaged with previously stored pixels in the layered depth image that have compared z-values that are less than a preset value from the retrieved pixel's z-value. The averaged result is saved based on the the ray traced locations and the retrieved pixels' z-values.

In accordance with other aspects of this invention, a method for rendering real-time three-dimensional images from prestored depth images in a global coordinate space on a display based on a viewpoint manipulation is provided. A layered depth image is generated from the prestored depth images based on a predetermined display viewpoint. Then, the generated layered depth image is assigned as the current layered depth image. An output image is generated from the current layered depth image based on the predetermined display viewpoint. Next, it is determined if the display viewpoint of the current layered depth image has been manipulated within the global coordinate space. An output image is generated from the current layered depth image based on the determined display viewpoint, if the display viewpoint has been manipulated and the manipulation is within a predetermined threshold distance from the current layered depth image's viewpoint. A next closest layered depth image is generated, if the display viewpoint has been manipulated and the manipulation is outside the predetermined threshold distance of the current layered depth images viewpoint. An output image is generating from the next closest layered depth image based on the determined display viewpoint and the next closest layered depth image is assigned as the current layered depth image, if the next closest layered depth image has been fully generated.

In accordance with still other aspects of this invention, the generating of an output image from the current and next closest layered depth image includes warping the generated layered depth image based on the manipulated display viewpoint, splatting the pixels from the layered depth image onto the warped image, and generating and displaying an output image based on the splat pixels.

In accordance with further other aspects of this invention, the splatting includes selecting one of two or more splat sizes and splatting pixels based on the splat size selected.

In accordance with still further other aspects of this invention, each splat size comprises a predefined splat mask.

In accordance with still yet farther other aspects of this invention, real-time three-dimensional stereo images are rendered from prestored depth images based on the techniques described above.

As will be readily appreciated from the foregoing summary, the invention provides a new and improved method, apparatus, and computer product for rendering real-time three-dimensional images on a display based on viewpoint manipulation of prestored depth images in a global coordinate space. Because the apparatus does not warp from multiple input DIs, for each frame generated, the disadvantages due to such warping is avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As will be better understood from the following description, the present invention is directed to an image based rendering system that renders multiple frames per second of an image of objects located in a transversable three-dimensional space. Each image to be rendered is generated from a layered depth image (LDI) that comprises information from multiple precreated depth images (DI).

Figure 5A:
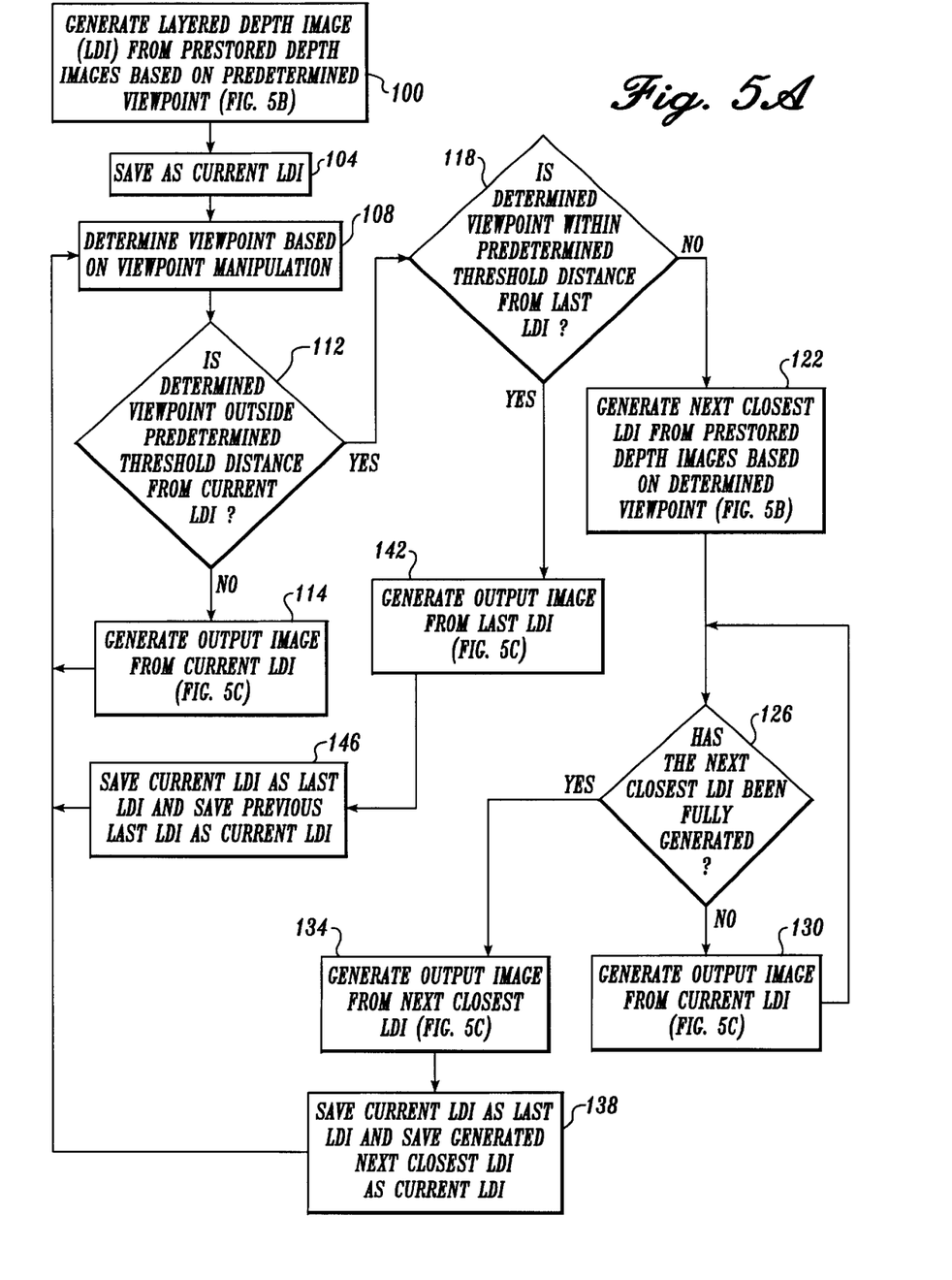
FIGS. 5A–C are flow diagrams of the present invention.
Figure 5B:
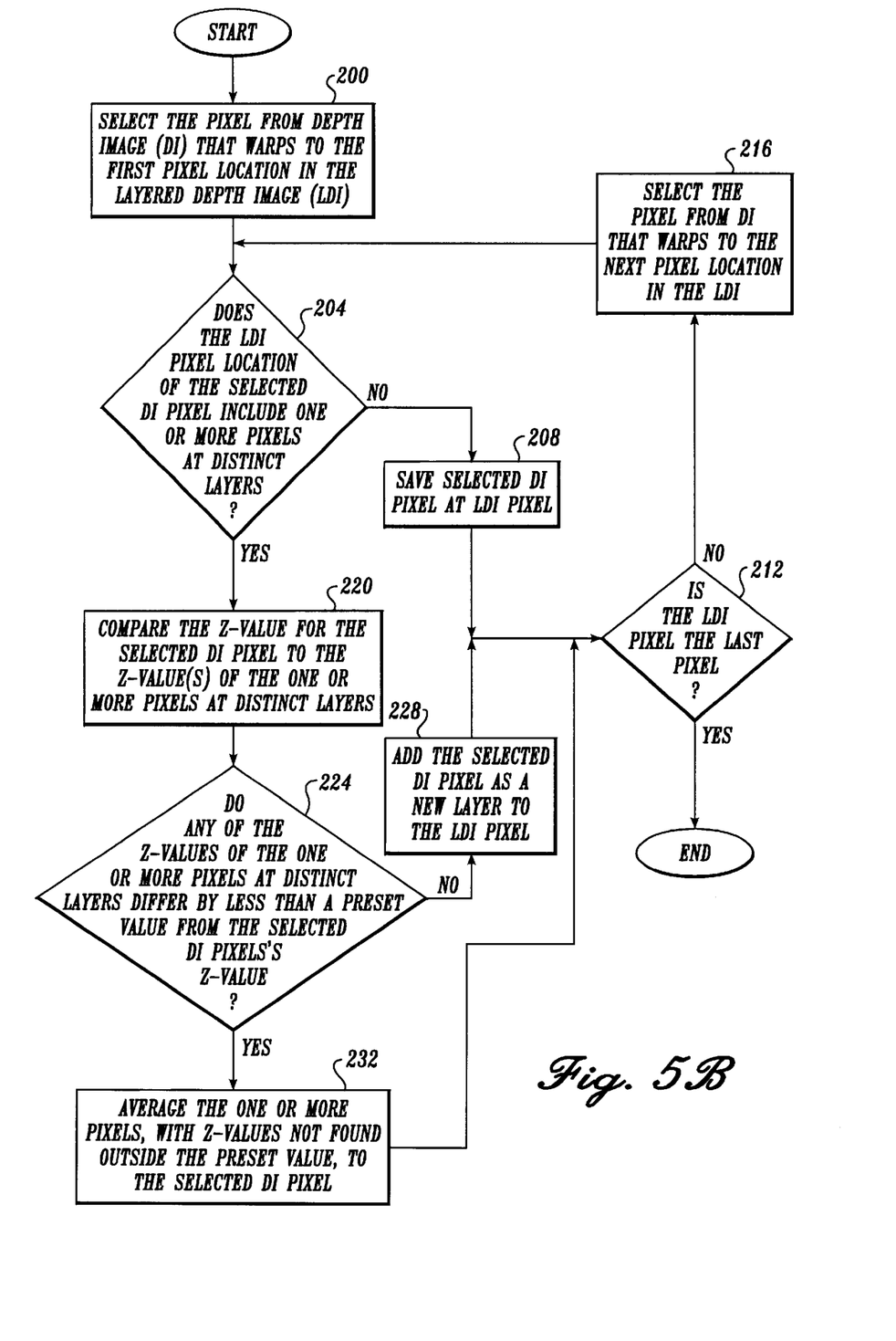
Figure 5C:
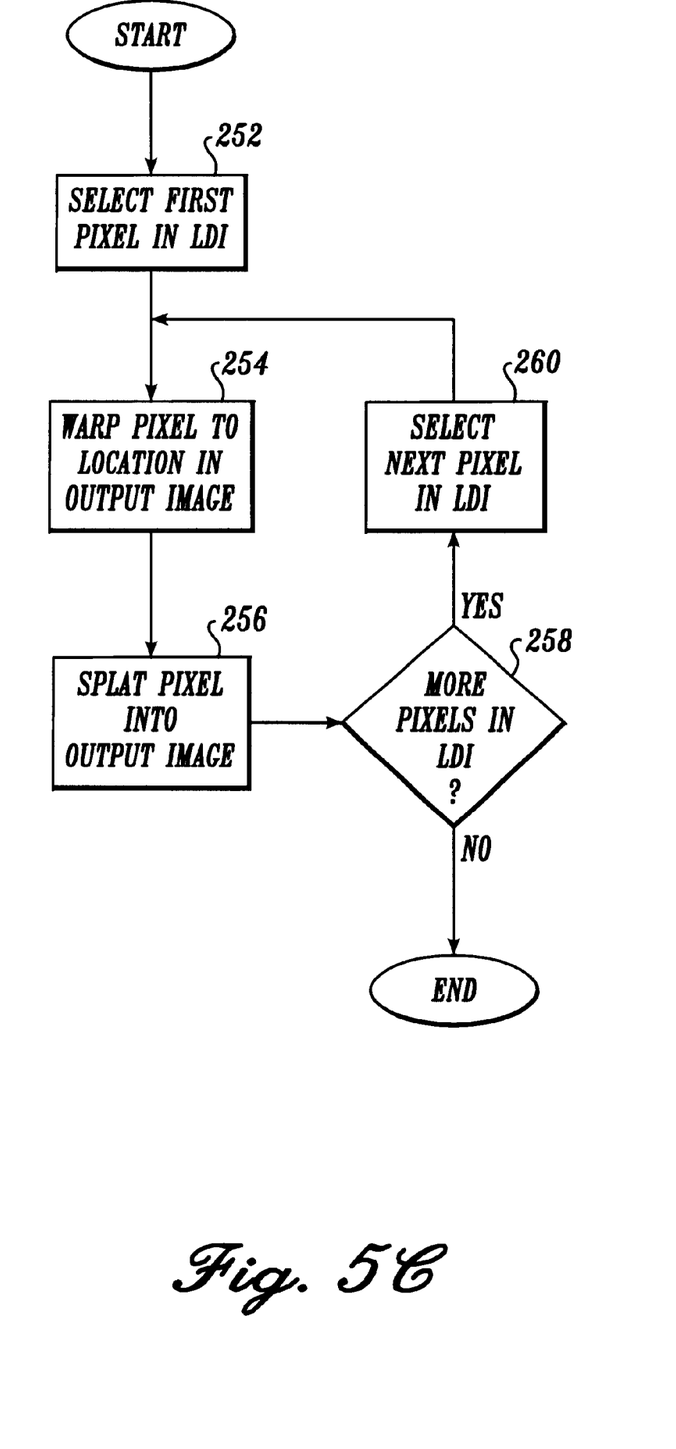

A DI is an image with single depth or z information in addition to the color (RGB), and optionally a normal stored for each pixel. As will be described in more detail below with FIG. 5, the construction of the LDI is decoupled from the final rendering of images from desired viewpoints. Thus, the LDI construction does not need to run at multiple frames per second to allow for interactive camera motion. The LDI is then processed in real-time, multiple frames per second, into an output image based on a desired camera view.

Figure 1:
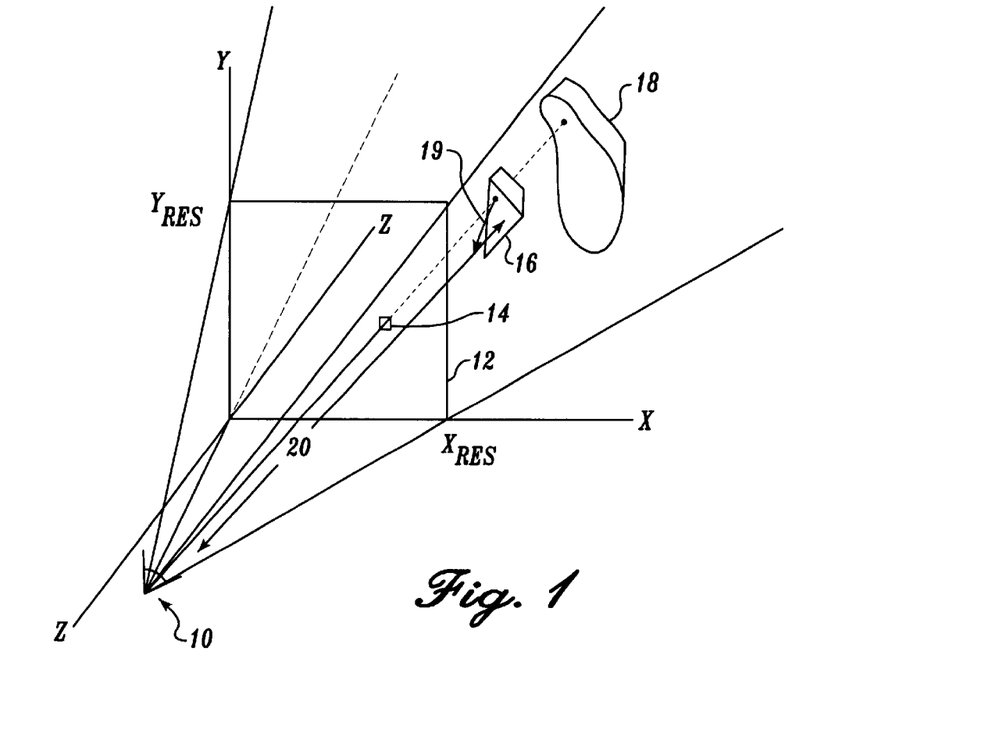
FIG. 1 is an illustration of a camera view of objects in a three-dimensional space.
Figure 2:
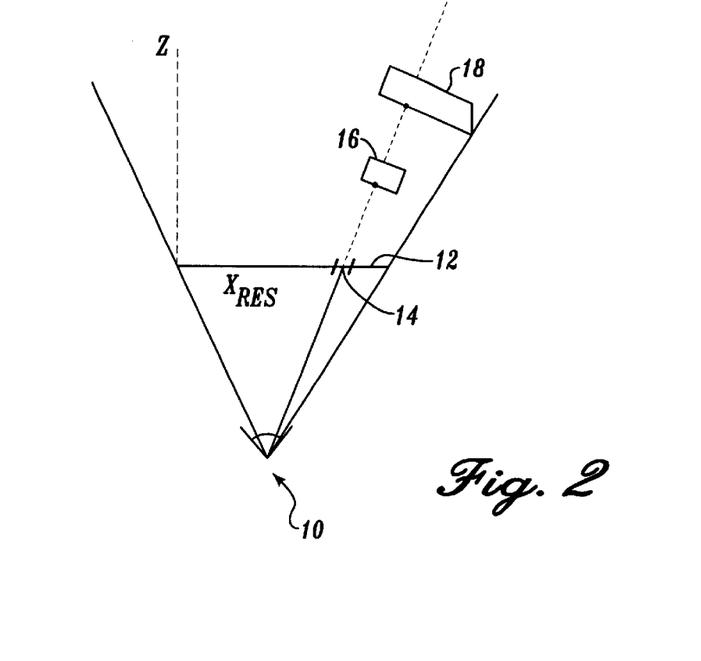
FIG. 2 is a top view of the camera view of FIG. 1.

FIGS. 1 and 2 illustrate the geometric relationships based on the present invention. The location of camera view 10 is identified by x, y, and z coordinates within a global coordinate system. A projection plane or display area 12 is identified by $X_{res}$ by $Y_{res}$. The camera view 10 is at some fixed predefined focal length from the display area 12. The display area 12 includes a predefined number of pixels 14.

Each LDI contains camera viewpoint information relating to various features of the camera view and an array of layered depth pixels. The array size is $X_{res}$ by $Y_{res}$. Each layered depth pixel includes pixel image data and an integer indicating the number of valid layers contained in that pixel. For pixel 14 in the example shown, two valid layers are present: one from object 16, and one from object 18. The pixel image data relates to the objects in the three-dimensional space along a particular line-of-sight or ray from the camera position. In FIG. 1, the closest object for pixel 14 is object 16. The pixel image data includes the color, the depth of the object, and an index into a table. The index is formed from a combination of the normal of the object seen 19 and the distance from the camera 20 that originally captured the pixel. The index is used to compute splat size and is described in more detail below with FIG. 6.

Figure 3:
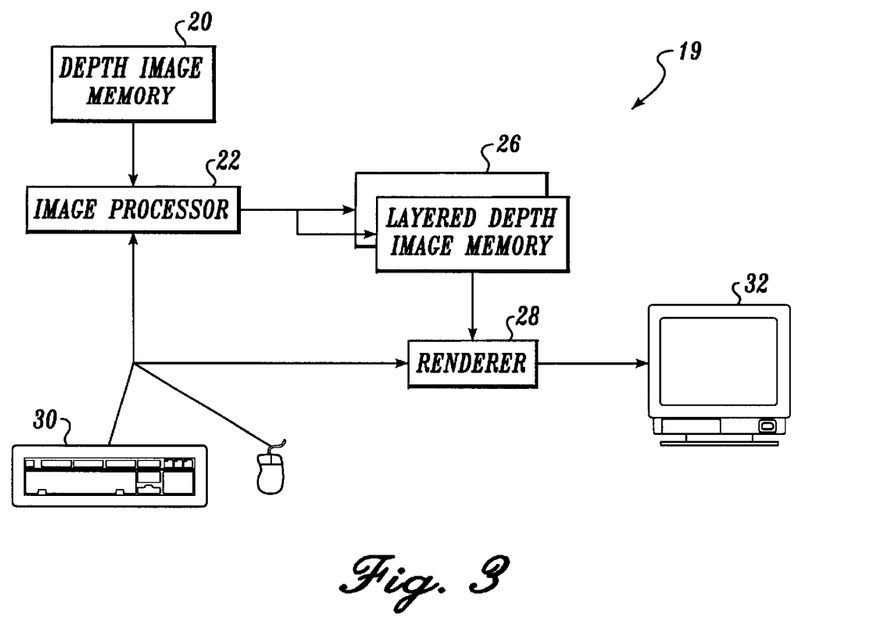
FIGS. 3 and 4 are diagrams of systems operable with the present invention.

FIG. 3 is an illustrative embodiment of a computer system 19 capable of implementing the method of the present invention, described in more detail below with respect to FIG. 5. The computer system 19 includes a depth image memory 20 for storing pregenerated DIs, an image processor 22 connected to the first memory 20 and a layered depth image memory 26 connected to the image processor 22 for storing LDIs. While shown as separate memories for ease of illustration, the depth image memory 20 and the layered depth image memory 26 could be located in a single memory, such as removable memory or on a hard disc drive. The computer system 19 also includes a fast warping based renderer 28 connected to the layered depth image memory 26, at least one user interface (UI) device 30 connected to the image processor 22 and renderer 28, and a display 32 connected to the renderer 28. The UI devices 30 allow a user to request different displayable viewpoints of the image. As will be readily appreciated by those of ordinary skill in the art of user interfaces, the UI devices may be a mouse, keyboard, a voice command generator, or other type interactive device capable of directing movement through the image by generating viewpoint signals.

The image processor 22 generates LDIs from DIs stored in the depth image memory 20 and the renderer 28 outputs images to the display 32 processing the LDI based on the generated viewpoint signals. The processing of the LDI by the renderer 28 is performed in real-time and is described in more detail below with respect to FIGS. 5A and C. LDI generation is described in more detail below with respect to FIG. 5B. Real-time based on the present invention relates to producing images at multiple frames per second. A viewpoint signal as desired by a user through operation of the UI device is sent to the image processor 22 and the renderer 28. The renderer 28 is preferably a high speed processor for generating multiple frames per second. The image processor 22 does not require to be as fast as renderer 28. As will readily appreciated by those of ordinary skill in the art of data processing, processors and renderers may be components of a central processing unit or separate components.

Figure 4:
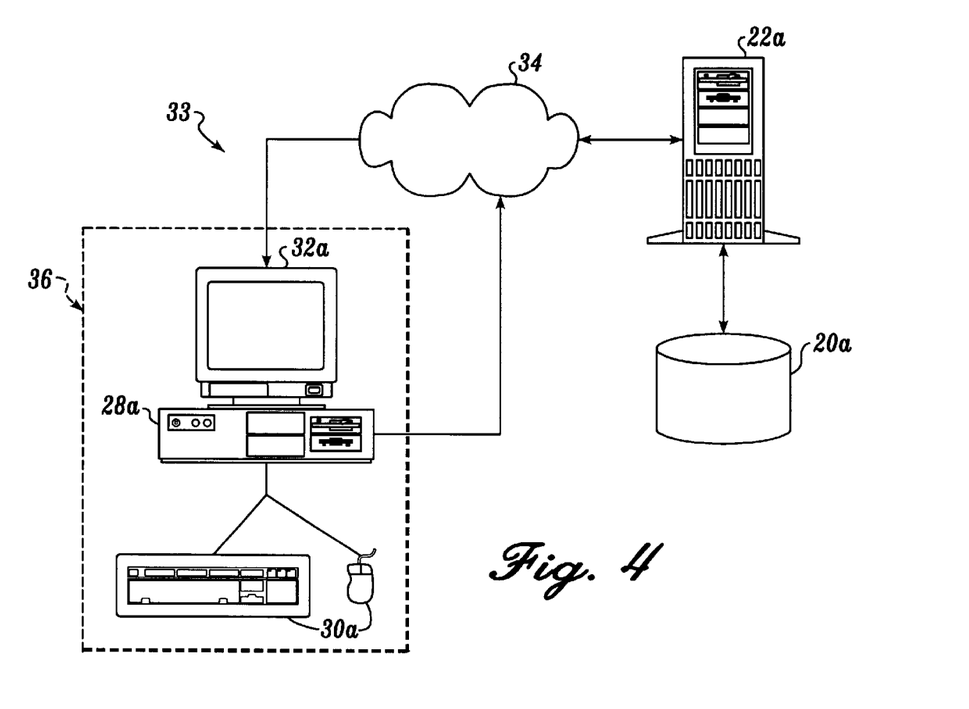

FIG. 4 is an illustrative embodiment of an alternate computer system 33 formed in accordance with the present invention. The FIG. 4 computer system 33 includes an image processor or server 22a and a renderer 28a that are remotely located from each other. The computer system 33 is implemented over a network 34. The network 34 is a public data network, such as the Internet, or a private data network. Time intensive image processing operations are performed at the server 22a which is connected over the network 34 to a user's system 36. The server 22a includes a database 20a for storing predefined DIs. In this configuration the server 22a is exclusively used for generating LDIs from DIs. The LDIs are downloaded to a user's system 36 across the network 34. The user's computer system 36 is typically a desktop computer connected to the network 34 through one of its data ports, but may be any other functionally comparable components. When the user's system 36 receives an LDI across the network 34 from the server 22a, it is displayed on display 32a thereby allowing interaction. If the user desires a new viewpoint, a desired viewpoint signal is sent back through the network 34 to the server 22a, thereby requesting that another LDI be generated, if the desired viewpoint is greater than a predefined amount. Therefore, the present invention is a useful tool for traversing through complex three-dimensional environments without requiring, at the local level, the intense processing required for generating LDIs from DIs. An example of a type of usage over a network would be a car company wanting to let customers view and travel through, at their leisure, pregenerated images of a new automobile they plan on selling. This example is used for illustrative purposes only. As will be readily appreciated by those of ordinary skill in the art, various computer system configurations may be applied to the present invention provided they include components for performing the method of the present invention. In other words, image processing and rendering may be performed within a conventional central processing unit or specialty processors or depth image memory may be permanent memory at various locations.

FIGS. 5A–C illustrate the method briefly described above and performed by the computer systems 19 and 33 shown in FIGS. 3 and 4. First, at block 100, an LDI is generated from a predetermined number of prestored DIs based on a predetermined or default viewpoint. LDI generation is described in more detail below with respect to FIG. 5B. Then, at block 104, the LDI is saved as the current LDI. The current LDI is a memory location identifier. At block 108, the process determines what viewpoint is desired based on a user desired viewpoint that is generated by interaction with the displayed image using the UI device, (i.e., viewpoint manipulation). This interaction may be the simple act of activating the arrow buttons on a keyboard or controlling the cursor by a mouse. Next, the process determines if the viewpoint desired is outside a predetermined threshold distance from the current LDI, at decision block 112. If the determined viewpoint is not outside the predetermined threshold distance, at block 114, an output image is generated from the current LDI. Generation of an output image from an LDI is described in more detail below with respect to FIG. 5C. If the determined viewpoint is outside the predetermined threshold distance, the process determines if the determined viewpoint is within the predetermined threshold distance from an LDI stored as a last LDI. See decision block 118. Storage of an LDI as the last LDI is described below. If no LDI is stored as a last LDI or if the determined viewpoint is not within the predetermined threshold distance from the last LDI, at block 122, a next closest LDI from prestored depth image is based on the determined viewpoint. Next closest LDI generation is described in more detail below with respect to FIG. 5B. Since LDI generation is slow as compared to the generation of output images from LDIs, the process determines if the next closest LDI has been fully generated. See decision block 126. If the next closest LDI has not been fully generated, the output image is generated from the current LDI and returns to the decision performed in decision block 126, as shown in block 130. Once the next closest LDI has been fully generated an output image is generated from the next closest LDI. Again, output image generation from an LDI is described in more detail below with respect to FIG. 5C. See block 134. Next, at block 138, the current LDI is saved as the last LDI and the generated next closest LDI is saved as the current LDI. Essentially, what is being performed by the step at block 138 is a swapping of the current and last LDIs in memory. The process then returns to the viewpoint determination at block 108.

If, at decision block 118, the viewpoint was determined to be within the predetermined threshold distance from the last LDI, an output image is generated from the last LDI. See block 142. Again, output image generation from an LDI is described in more detail below with respect to FIG. 5C. Then, at block 146, the current LDI is saved as the last LDI and the previous last LDI is saved as the current LDI. Essentially, this step is performing a storage location swap of the last and current LDIs. Once the saving is complete, the process returns to the viewpoint determination step shown at block 108. As will be readily appreciated by those of ordinary skill in the art of three-dimensional display generation, the viewpoint determination process performed at block 108 is continually performed throughout the process shown in FIG. 5A Specifically, the output image generations shown in blocks 130 and 134 must have up-to-date viewpoint information in order to generate accurate output images.

FIG. 5B illustrates LDI generation from prestored depth images from block 100 in FIG. 5A First, at block 200, the pixel from the DI that corresponds or warps to the first pixel location in the LDI is selected. Then, at decision block 204, the process determines if the LDI pixel location that corresponds to the selected DI pixel includes one or more pixels at distinct layers. If there are no pixels stored at distinct layers within the LDI at the pixel location that corresponds to the selected DI pixel, the selected DI pixel is stored at the LDI pixel location based on the DI pixel's z-value. See block 208. If at decision block 212 the LDI pixel location that corresponds to the selected DI pixel is the last pixel location in the LDI, the process selects from the DI the pixel that warps or corresponds to the next pixel location in the LDI, at block 216, and returns to decision block 204. If at decision block 204 the process determines that there are pixels located at the pixel location that corresponds to the selected DI pixel, the process compares the z-value for the selected DI pixel to the z-value(s) of the located one or more pixels. See block 220. Then, at decision block 224, the process determines if any of the z-values of the one or more pixels at distinct layers within the LDI differ by less than a preset value from the selected pixel z-value. If the one or more pixels do not differ by less than the preset value, the selected DI pixel is added as a new layer to the LDI pixel. See block 228. If, however, the z-values of the one or more pixels of the LDI differ by less than the preset value, the process takes the average of the one or more pixels with z-values that differ by less than the preset value to the selected DI pixel. See block 232. Once the steps in blocks 228 and 232 are complete the process continues onto decision block 212, thereby continuing until the DI has been fully mapped to the LDI. Essentially what is being performed in the process described above for FIG. 5 is the incorporation of the pixels of prestored depth images into a single layered depth image. The process is determining if pixels have already been mapped to a common location in the layered depth image (from previous depth images) when a mapping is occurring from a pixel in a present depth image. If pixel information at the LDI already exists the mapped pixel from the depth image is stored at a z-value location if its z-value is greater by a preset value than all the other pixels stored at that LDI pixel location. If there already exists a pixel at the same z-value or a z-value that is within the preset value then the mapped pixel is averaged with those pixels. As will be readily appreciated by those of ordinary skill in the art of image warping, the terminology applied to the above description is intended to describe the warping of an image to a different viewpoint.

FIG. 5C illustrates the output image generation from an LDL The process illustrated in FIG. 5C is that performed in blocks 114, 130, 134 and 142 of FIG. 5A. First, at block 252 the process begins by selecting the first pixel in the LDI to be used to generate the output image. At block 254, the selected pixel is warped to the location required by the desired viewpoint for the output image. Then, the pixel is splatted into the warp location, at block 256, thereby generating an output image for display. If, at decision block 258, more unwarped pixels remain from the LDI, the next pixel is selected and the process returns to block 254. Once no more unwarped pixels remain, the output image is fully generated and displayed.

The process illustrated in FIG. 5C is capable of generating a stereographic output image with a few minor changes (not shown). Since a stereographic image includes two images from two different viewpoints, the distance between the two views is a predetermined value. The process of generating an output image, as shown in FIG. 5C, generates two output images based on the predetermined distance value for stereographic image generation. Then, the two generated output images are displayed on a stereographic output device.

The LDI warping process, performed in an illustrative embodiment of the present invention, begins with a four-by-four matrix C that represents the camera view for each LDI. The matrix C, includes information relating to the position of the camera or viewpoint in global 3-D space, the dimensions of the camera viewing angle, the resolution level for the camera's projection plane or display area, and the distance of camera to the display area.

$C_1$ transforms a point from the global coordinate system that represents the three-dimensional environment into the image coordinate system of a first LDI camera view. The image coordinates $(x_1, Y_1)$ index a pixel address and are obtained after multiplying each point's global coordinates by $C_1$ and dividing out w (homogenous coordinate). The $z_1$ coordinate is used for depth comparisons in a z buffer.

A transfer matrix is defined as $T_{1,2}=C_2 \cdot C_1^{-1}$. The transfer matrix computes the image coordinates as seen in the output camera view, based on the image coordinates seen in the LDI camera. In the following description, the output camera view refers to the user-desired view requested through the user interface device. Equation 1 determines the coordinates $(x_2, y_2, z_2)$ of the LDI warped to the desired $$T_{1,2} \cdot \begin{bmatrix} x_1 \\ y_1 \\ z_1 \\ 1 \end{bmatrix} = \begin{bmatrix} x_2 \cdot w \\ y_2 \cdot w \\ z_2 \cdot w \\ w \end{bmatrix} = resultVec \qquad (1)$$

The coordinates $(x_2, y_2)$ obtained after dividing out w, index a pixel address in the output camera's image.

As can be readily appreciated by those of ordinary skill in the art, this matrix multiply can be factored to allow reuse of much of the computation as one iterates through the layers of a layered depth pixel, as shown in Equations 2 and 3.

$$T_{1,2} \cdot \begin{bmatrix} x_1 \\ y_1 \\ z_1 \\ 1 \end{bmatrix} = T_{1,2} \cdot \begin{bmatrix} x_1 \\ y_1 \\ 0 \\ 1 \end{bmatrix} + z_1 \cdot T_{1,2} \cdot \begin{bmatrix} 0 \\ 0 \\ 1 \\ 0 \end{bmatrix} \qquad (2)$$

$$= startVec + z_1 \cdot depthVec$$

To compute the warped position of the next layered depth pixel along a scanline, the new startVec is simply incremented, as shown in Equation 3.

$$T_{1,2} \cdot \begin{bmatrix} x_1+1 \\ y_1 \\ 0 \\ 1 \end{bmatrix} = T_{1,2} \cdot \begin{bmatrix} x_1 \\ y_1 \\ 0 \\ 1 \end{bmatrix} + T_{1,2} \cdot \begin{bmatrix} 1 \\ 0 \\ 0 \\ 0 \end{bmatrix} \qquad (3)$$

$$= startVec + incrVec$$

$$[C_2 C_1^{-1}] x_s = x_{2s} \qquad (4)$$

$C_2$ -output camera (desired viewpoint)

Figure 6:
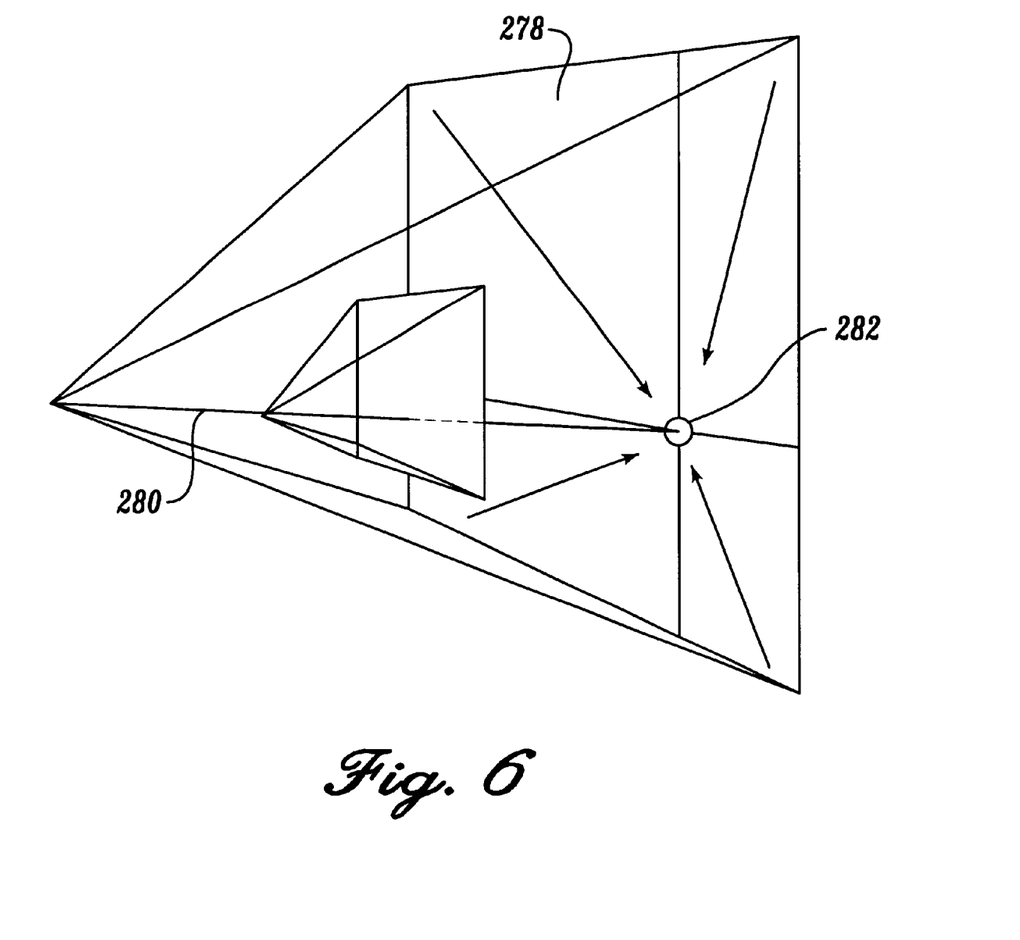
FIG. 6 is a perspective view of camera views and their geometric relationship as determined based on the present invention.

The warping algorithm, Equation 4, is similar to McMillan's ordering algorithm discussed in "A list-priority rendering algorithm for redisplaying projected asurfaces", *UNC Technical Report* 95-005, University of North Carolina, 1995. As shown in FIG. 6, first the depth order of layered depth pixels is computed by first finding the projection of the output camera's location in the LDI camera's image plane 278. This is the intersection of the line joining the two camera locations with the LDI camera's image plane 278. The line joining the two camera locations is called the epipolar line 280 and the intersection with the image plane is called an epipolar point 282. The LDI image is then split horizontally and vertically at the epipolar point 282, creating four image regions. Two or one regions may exist, if the epipolar point 282 lies off the image plane 278. For each region, the LDI is traversed in (possibly reverse) scan line order. At the beginning of each scan line, startVec is computed. The sign of incrVec is determined by the direction of processing in the region. Each layered depth pixel in the scan line is then warped to the output image. This procedure visits each of the layers of a pixel in back to front order and computes resultVec to determine its location in the output image. As in texture mapping, a divide is required per pixel. Finally, the depth pixel's color is splatted at this location in the output image.

To splat the LDI into the output image, the projected area or size of the warped pixel is approximated. The proper size is computed as shown in Equation 5.

$$size = \frac{(d_1)^2 \cos(\theta_2) res_2 \tan(.5 fov_1)}{(d_2)^2 \cos(\theta_1) res_1 \tan(.5 fov_2)} \qquad (5)$$

Figure 7:
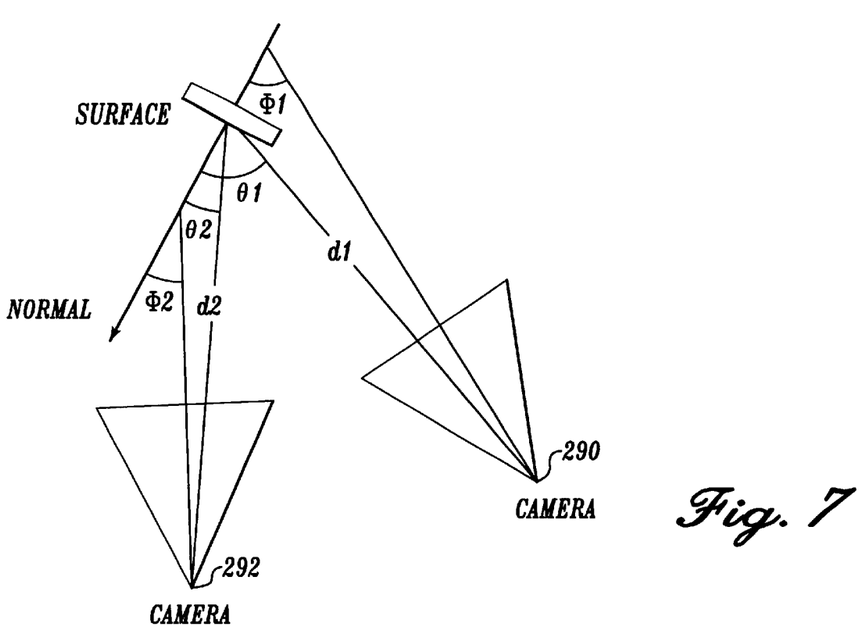
FIG. 7 is a top view of multiple camera views of an object in space.

As shown in FIG. 7, $d_1$ is the distance from the sampled surface point to the LDI camera 290, $fov_1$ is the field of view of the LDI camera 290, $res_1$ is the pixel resolution of the LDI camera 290, and $\theta_1$ is the angle between the surface normal and the line of sight to the LDI camera 290. $\theta_2$, $d_2$, and $res_2$ refer to similar values with respect to the output camera view 292.

It is more efficient to compute an approximation of the square root of size, as shown in Equation 6.

$$\sqrt{size} = \frac{1}{d_2} \cdot \frac{d_1 \sqrt{\cos(\theta_2) res_2 \tan(.5 fov_1)}}{\sqrt{\cos(\theta_1) res_1 \tan(.5 fov_2)}} \qquad (6)$$

$$\approx \frac{1}{z_{e2}} \cdot \frac{d_1 \sqrt{\cos(\phi_2) res_2 \tan(.5 fov_1)}}{\sqrt{\cos(\phi_1) res_1 \tan(.5 fov_2)}} \qquad (7)$$

$$\approx z_2 \cdot lookup[nx, ny, d1] \qquad (8)$$

AS shown in Equation 7, $\theta$ is approximated as the angles $\phi$ between the surface normal vector and the z axes of the camera's coordinate systems. Also, $d_2$ is approximated by using $z_{e2}$, which is the z coordinate of the sampled point in the output camera's unprotected eye coordinate system.

Figure 8:
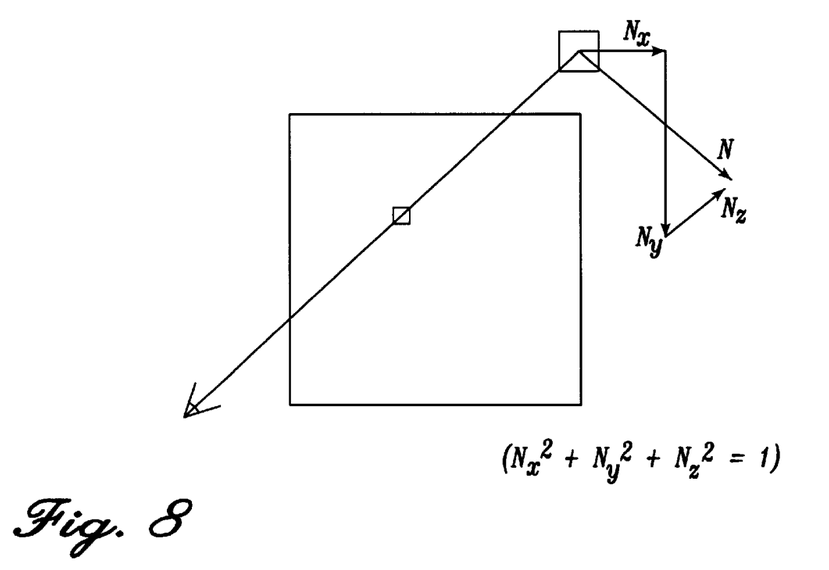
FIG. 8 is an illustration of geometric relationships of an object viewed from a single camera based on the present invention.

Since this embodiment provides three splat sizes, the lengthy computations of Equations 6 and 7 are unnecessary. Therefore, as shown in Equation 8, an approximation of the size computation is implemented using a lookup table. For each pixel in the LDI, two bits represent $d_1$, and four bits encode the normal (two bits for $n_x$, and two bits for $n_y$), as shown in FIG. 8. This produces a six-bit lookup table with 64 possible indexes. Before rendering each new image, the new output camera information precomputes values for the 64 possible lookup table indexes. During rendering a projection matrix $P_2$ included within $C_2$ is chosen such that $z_2=1/z_{e2}$. At each pixel, $\sqrt{size}$ is obtained by multiplying the computed $z_2$ by the value found in the lookup table.

The three splat sizes are a one pixel, a three by three pixel, and a five by five pixel footprint, as shown below. Each pixel in a footprint has an alpha value of one, one-half or one-fourth, therefore the alpha blending is performed with integer shifts and adds. The following splat masks are used:

$$1 \text{ and } .25 \begin{bmatrix} 1 & 2 & 1 \\ 2 & 4 & 2 \\ 1 & 2 & 1 \end{bmatrix} \text{ and } .25 \begin{bmatrix} 1 & 2 & 2 & 2 & 1 \\ 2 & 2 & 4 & 2 & 2 \\ 2 & 4 & 4 & 4 & 2 \\ 2 & 2 & 4 & 2 & 2 \\ 1 & 2 & 2 & 2 & 1 \end{bmatrix}$$

As will be appreciated by those of ordinary skill in the art of pixel splatting, various splat patterns and sizes may be chosen depending upon system capabilities, and desired processing speed and image quality.

While the present invention has been illustrated with reference to exemplary embodiments, those skilled in the art will appreciate that various changes in form and detail may be made without departing from the intended scope of the present invention as defined in the appended claims. Because of the variations that can be applied to the illustrated and described embodiments of the invention, the invention should be defined solely with reference to the appended claims.

The embodiments of the invention in which an exclusive property or privilege is claimed are defined as follows:

1. A method for rendering real-time three-dimensional images from prestored depth images in a global coordinate space on a display based on a viewpoint manipulation, said method comprising:

(a) generating a layered depth image from the prestored depth images based on a predetermined perspective display viewpoint;

(b) assigning the generated layered depth image as the current layered depth image;

(c) rendering an output image only from the current layered depth image based on the predetermined perspective display viewpoint;

(d) determining if the perspective display viewpoint of the current layered depth image has been manipulated within the global coordinate space;

(e) rendering an output image only from the current layered depth image based on the determined perspective display viewpoint, if the perspective display viewpoint has been manipulated and the manipulation is within a predetermined threshold distance from the current layered depth image's perspective viewpoint;

(f) generating a next closest layered depth image, if the perspective display viewpoint has been manipulated and the manipulation is outside the predetermined threshold distance of the current layered depth image's perspective viewpoint; and (g) rendering an output image only from the next closest layered depth image based on the determined perspective display viewpoint and assigning the next closest layered depth image as the current layered depth image and repeating (d)–(g), if the next closest layered depth image has been fully generated.

2. The method of claim 1, wherein generating a layered depth image from the prestored depth images is performed remote from generating an output image.

3. The method of claim 1, wherein generating an output image directly from the current and next closest layered depth image further comprises:

i) warping the generated layered depth image based on the manipulated perspective display viewpoint;

ii) splatting the pixels from the layered depth image onto the warped image; and iii) generating and displaying an output image based on the splatted pixels.

4. The method of claim 3, wherein the splatting comprises selecting one of two or more splat sizes and splatting pixels based on the splat size selected.

5. The method of claim 4, wherein each splat size comprises a predefined splat mask.

6. The method of claim 1, wherein said generating a layered depth image from the prestored depth images based on a predetermined perspective display viewpoint further comprises:

i) retrieving a pixel from the depth image that corresponds to a ray-traced location within the layered depth image;

ii) comparing the z-value of the retrieved pixel to the z-values of pixels previously stored at z-value layers within the layered depth image at the ray-traced location within the layered depth image that corresponds to the retrieved pixel from the depth image;

iii) saving the retrieved pixel in the layered depth image based on the ray-traced location and the retrieved pixel's z-value, if no previously stored pixels have a compared z-value that is less than a preset value from the retrieved pixel's z-value;

iv) averaging the retrieved pixel in the layered depth image to previously stored pixels that have compared z-values that are less than a preset value from the retrieved pixel's z-value; and v) saving the averaged result based on the ray-traced location and the retrieved pixel's z-value.

7. The method of claim 6, further comprising:

vi) repeating i)–v) until all ray traced locations of the layered depth image have been analyzed with respect to each of the one or more depth images.

8. A computer-readable medium having computer-executable instructions for rendering real-time three-dimensional images from prestored depth images in a global coordinate space on a display based on a viewpoint manipulation, which, when executed, comprise:

(a) generating a layered depth image from the prestored depth images based on a predetermined perspective display viewpoint;

(b) assigning the generated layered depth image as the current layered depth image;

(c) rendering an output image only from the current layered depth image based on the predetermined perspective display viewpoint;

(d) determining if the perspective display viewpoint of the current layered depth image has been manipulated within the global coordinate space;

(e) rendering an output image only from the current layered depth image based on the determined perspective display viewpoint, if the perspective display viewpoint has been manipulated and the manipulation is within a predetermined threshold distance from the current layered depth image's perspective viewpoint;

(f) generating a next closest layered depth image, if the perspective display viewpoint has been manipulated and the manipulation is outside the predetermined threshold distance of the current layered depth image's perspective viewpoint; and (g) rendering an output image only from the next closest layered depth image based on the determined perspective display viewpoint and assigning the next closest layered depth image as the current layered depth image and repeating (d)–(g), if the next closest layered depth image has been fully generated.

9. The computer readable medium of claim 8, wherein generating an output image directly from the current and next closest layered depth image further comprises:

i) warping the generated layered depth image based on the manipulated perspective display viewpoint;

ii) splatting the pixels from the layered depth image onto the warped image; and iii) generating and displaying an output image based on the splatted pixels.

10. A method for rendering real-time three-dimensional stereo images from prestored depth images in a global coordinate space on a display based on a viewpoint manipulation, said method comprising:

(a) generating a layered depth image from the prestored depth images based on a predetermined perspective display viewpoint;

(b) assigning the generated layered depth image as the current layered depth image;

(c) rendering stereo output images only from the current layered depth image based on the predetermined perspective display viewpoint and predetermined stereo image requirements;

(d) determining if the perspective display viewpoint of the current layered depth image has been manipulated within the global coordinate space;

(e) rendering stereo output images only from the current layered depth image based on the determined perspective display viewpoint and the predetermined stereo image requirements, if the perspective display viewpoint has been manipulated and the manipulation is within a predetermined threshold distance from the current layered depth image's perspective viewpoint;

(f) generating a next closest layered depth image, if the perspective display viewpoint has been manipulated and the manipulation is outside the predetermined threshold distance of the current layered depth image's perspective viewpoint; and (g) rendering stereo output images only from the next closest layered depth image based on the determined perspective display viewpoint and the predetermined stereo image requirements, and assigning the next closest layered depth image as the current layered depth image and repeating (d)–(g), if the next closest layered depth image has been fully generated.

11. The method of claim 10, wherein generating stereo output images directly from the current and next closest layered depth image further comprises:

i) warping the generated layered depth image based on the manipulated perspective display viewpoint and the predetermined stereo image requirements;

ii) splatting the pixels from the layered depth image onto the warped image; and iii) generating and displaying output images based on the splatted pixels.

12. The method of claim 10, wherein said generating multiple layered depth images from the prestored depth images comprises warping pixels from one or more depth images into each layered depth image.

13. The method of claim 12, wherein said warping pixels from one or more depth images into each layered depth image further comprises:

i) retrieving a pixel from the depth image that corresponds to a ray traced location within the layered depth image;

ii) comparing the z-value of the retrieved pixel to the z-values of pixels previously stored at z-value layers within the layered depth image at the ray traced location within the layered depth image that corresponds to the retrieved pixel from the depth image;

iii) saving the retrieved pixel in the layered depth image based on the ray traced location and the retrieved pixel's z-value, if no previously stored pixels have a compared z-value that is less than a preset value from the retrieved pixel's z-value;

iv) averaging the retrieved pixel in the layered depth image to previously stored pixels that have compared z-values that are less than a preset value from the retrieved pixels z-value; and v) saving the averaged result based on the ray traced location and the retrieved pixel's z-value.

14. The method of claim 13, further comprising:

vi) repeating i)–v) until all ray traced locations of the layered depth image have been analyzed with respect to each of the one or more depth images.

* * * * *

UNITED STATES PATENT AND TRADEMARK OFFICE
CERTIFICATE OF CORRECTION

PATENT NO. : 6,466,207 B1
DATED : October 15, 2002
INVENTOR(S) : S.J. Gortler et al.

It is certified that error appears in the above-identified patent and that said Letters Patent is hereby corrected as shown below:

Title page,
Item [56], References Cited, OTHER PUBLICATIONS, " "Heirarchical" should read -- "Hierarchical --
"www.llnL.gov/" should read -- "www.llnl.gov/ --
Insert in appropriate order: -- Max, N. et al., "Rendering Trees from Precomputed Z-Buffer Views, Sixth Eurographics Workshop on Rendering, "*Eurographics*, June, 1995. --

Column 2,
Line 10, "Ma" should read -- Max --
Line 14, "information of" should read -- information on --
Line 26, "MBR" should read -- IBR --
Line 41, "previouisly" should read -- previously --

Column 3,
Line 6, "depth images" should read -- depth image's --
Line 7, "is generating" should read -- is generated --
Line 25, "yet farther" should read -- yet further --
Line 35, "DIs," should read -- DIs --

Column 5,
Line 4, "does not require" should read -- is not required --
Line 5, "readily appreciated" should read -- readily be appreciated --

Column 6,
Line 18, "fully generated" should read -- fully generated, --

Column 7,
Line 8, "onto" should read -- to --
Line 17, "exists the" should read -- exists, the --
Line 22, "preset value" should read -- preset value, --
Line 28, "LDL." should read -- LDI. --
Line 53, "C, includes" should read -- C includes --
Line 61, "$(x_1, Y_1)$" should read -- $(x_1,y_1)$ --

Column 8,
Line 4, "the desired" should read -- the desired viewpoint. --
Line 45, "asurfaces"," should read -- surfaces", --

UNITED STATES PATENT AND TRADEMARK OFFICE
CERTIFICATE OF CORRECTION

PATENT NO. : 6,466,207 B1
DATED : October 15, 2002
INVENTOR(S) : S.J. Gortler et al.

It is certified that error appears in the above-identified patent and that said Letters Patent is hereby corrected as shown below:

Column 9,
Line 24, (Equation No. 7)

$$" \approx \frac{1}{ze2} \cdot \frac{d1\sqrt{\cos(\phi 2)res2 \tan(.5\,fov1)}}{\sqrt{\cos(\phi 1)res1)\tan(.5\,fov2)}} "$$

should read $$-- \approx \frac{1}{ze2} \cdot \frac{d1\sqrt{\cos(\phi 2)res2 \tan(.5\,fov1)}}{\sqrt{\cos(\phi 1)res1\tan(.5\,fov2)}} --$$

Line 28, "AS" should read -- As --
Line 32, "unprotected" should read -- unprojected --
Line 41, "During rendering" should read -- During rendering, --
Line 47, "one-halt" should read -- one-half --
Line 48, "fourth," should read -- fourth; --

Column 11,
Line 48, "computer readable" should read -- computer-readable --

Column 12,
Line 59, "pixels z-value;" should read -- pixel's z-value; --

Signed and Sealed this

First Day of April, 2003

JAMES E. ROGAN
*Director of the United States Patent and Trademark Office*